July 2, 1929.  G. J. HOUTS  1,719,609
APPARATUS FOR SUPPORTING COMPOSITE STRANDS
Filed Oct. 22, 1924  2 Sheets-Sheet 2
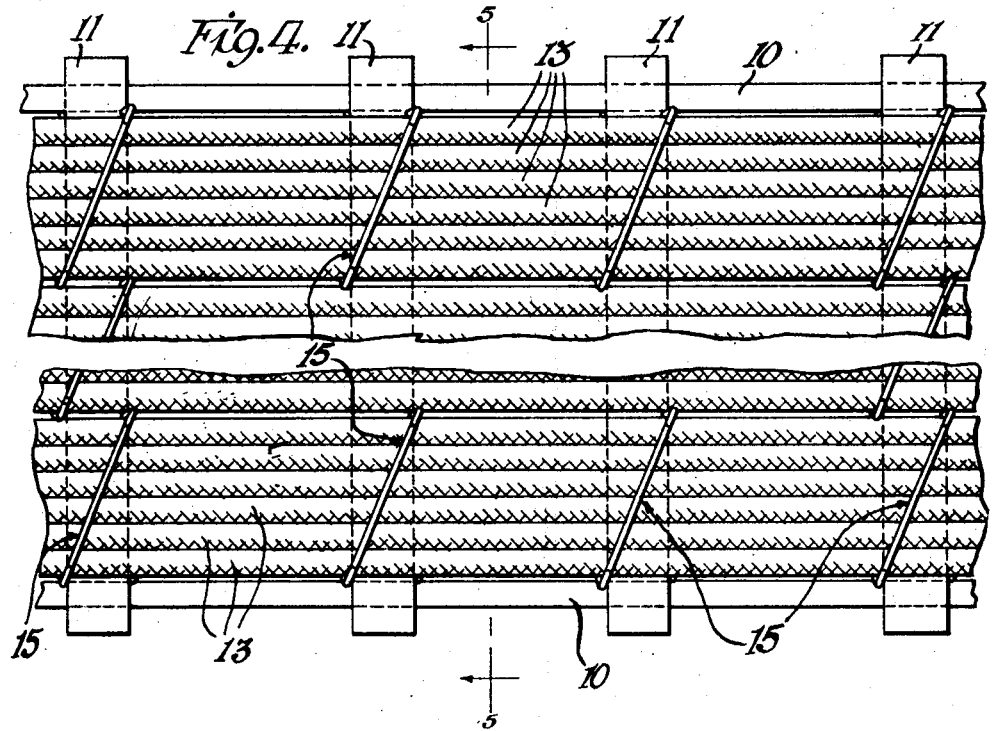
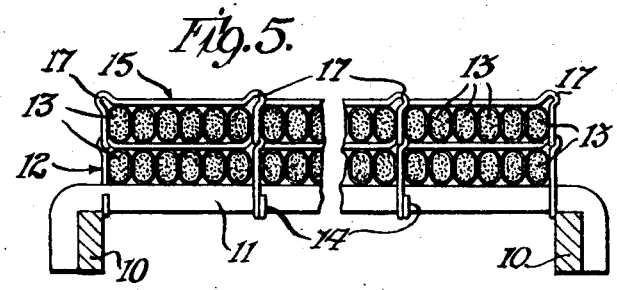
Inventor
Guy J. Houts
by [signature]
Att'y.

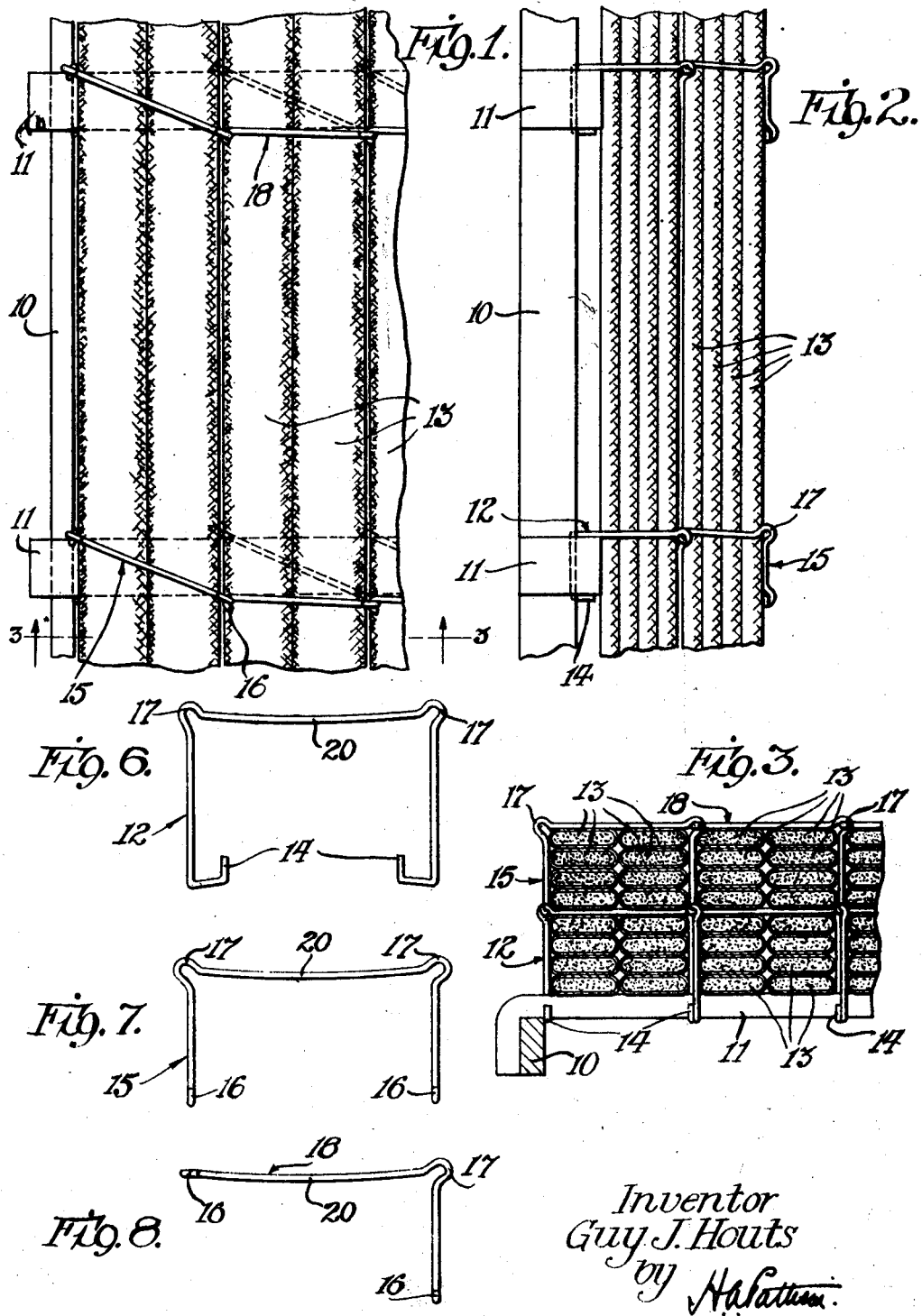

Patented July 2, 1929.

1,719,609

UNITED STATES PATENT OFFICE.

GUY JOSEPH HOUTS, OF OAK PARK, ILLINOIS, ASSIGNOR TO WESTERN ELECTRIC COMPANY, INCORPORATED, OF NEW YORK, N. Y., A CORPORATION OF NEW YORK.

APPARATUS FOR SUPPORTING COMPOSITE STRANDS.

Application filed October 22, 1924. Serial No. 745,093.

This invention relates to composite strands and apparatus for supporting the same.

In interconnecting electrical apparatus such as is employed in telephone exchanges, it is frequently the practice to assemble the individual electrical conductors or cables, passing from one group of apparatus to another, into units attached to and supported by suitable framework. Especially in wiring telephone exchanges with electrical conductors in cable form, it has been the practice, in some instances, to fasten the cables to each other and to the framework by means of textile strands, such as twine. In such cases, usually, a layer of cables is laced or tied to the framework by means of twine, and additional layers of cables are attached in a similar manner, either to the previously supported cables, their associated twine, or to the framework. Due to its character, this method of securing cables is called sewing. Such a method is somewhat slow and requires experience and a high degree of skill on the part of the workman.

The primary object of this invention is to produce improved composite strands, such as cable assemblies by using improved apparatus.

Other objects and advantages will become apparent in the following detailed description, and the novel features of the invention will be particularly pointed out in the appended claims.

In accordance with one embodiment of the present invention, there is provided a plurality of resilient members each adapted to embrace a predetermined number of strands or cables to form a composite unit thereof. Each member is provided with one or more hooked portions by which it may be easily and quickly fastened to a support such as a cable rack or runway, or to looped portions of simillar members embracing previously supported strands or cables. A portion of each member is slightly depressed, which serves, when the member is secured in place, to securely clamp the included strands or cables to the support or to the previously supported strands or cables.

In the accompanying drawings which illustrate one embodiment of the invention,

Fig. 1 is a fragmentary front elevation of a vertical cable rack showing the improved method of and apparatus for supporting cables thereon;

Fig. 2 is a side elevation thereof;

Fig. 3 is a sectional view taken on the line 3—3 of Fig. 1;

Fig. 4 is a fragmentary front elevation similar to Fig. 1 showing the method of fastening cables to a horizontal cable rack;

Fig. 5 is a sectional view taken on the line 5—5 of Fig. 4, and

Figs. 6, 7, and 8 are enlarged detail views of various types of the improved clips used for fastening the cables to supports and to each other.

The invention as herein illustrated and described is particularly applicable for fastening telephone switchboard cables to racks and runways, but it is to be understood that the novel features of the invention are capable of other applications and the invention is to be limited only as set forth in the appended claims.

Referring now to the drawings in detail wherein like reference characters designate corresponding parts throughout the several views, 10 indicates a cable runway to which is secured a plurality of cross straps 11. Members 12 (Fig. 6) embracing a plurality of cables 13 are secured to the cross straps 11 by means of bent or hooked portions 14, as indicated in Fig. 3. Members 15 (Fig. 7), similar to the members 12, embrace a plurality of additional cables 13 and are provided with hooked portions 16 by which they are secured to looped portions 17 of the members embracing previously supported cables. An angular member 18 (Fig. 8) may be employed in place of the member 15, when it is inconvenient to gain access to the looped portions of the previously mounted members in order to secure thereto a member supporting additional cables. Fig. 3 illustrates the use of each of the members shown in Figs. 6, 7, and 8 and the manner in which they are fastened to each other and to the cross straps 11. The members 12, 15, and 18 are preferably composed of music wire and are provided with a depressed resilient portion 20 by which the included strands or cables are securely clamped to the support or to similar members supporting previously mounted cables.

In practicing the improved method of fastening cables to frameworks, such as cable runways, a plurality of cables are placed in position with their longitudinal axes parallel to each other and substantially at right angles to the cross straps 11 of the cable runway. Clamping members 12 are then placed around predetermined numbers of these cables and spaced along the cables to agree with the positions of the cross straps. The bent or hooked portions 14 of the members 12 are then engaged with the cross straps by means of a suitable tool or otherwise. Preferably one hooked portion of each member is first placed around the strap, after which the member is flexed and the enclosed cables are thereby slightly compressed, to permit the free end of the other portion to move back of the strap and across the back surface thereof. As soon as such free end reaches the distant edge surface of the strap the pressure exerted on the cables and the members is released, whereupon the latter mentioned hooked portion engages the strap while the cables expand to substantially their original size. However, although the resilient member 12 also tends to return to its normal condition, it is so designed that the portion 20 between the ear portions 17 does not attain its normal bowed or depressed shape, but becomes substantially straight and in contact with the enclosed cables throughout its length. Thus the cables are securely attached to the cable runway. This operation is repeated until a complete layer of cables is attached to the cross straps of the runway.

After the cables of the first layer have been fastened to the framework, clamping members 15 are caused to firmly embrace a predetermined number of additional cables and the hooked portions 16 thereof are caused to engage the looped portions 17 of a previously mounted clamping member in a manner similar to that described in connection with member 12. In some instances, especially where it is inconvenient to gain access to the looped portions of a previously mounted clamping member in order to fasten thereto a member embracing additional cables, the clamping member 18 is used instead of the clamping member 15 and its hooked portions 16 are caused to engage the looped portions of oppositely disposed previously mounted clamping members.

From the above description it is apparent that by the method and apparatus herein disclosed, cable assemblies may be built up group by group and may be readily and rapidly secured to a framework support or cable runway.

What is claimed is:

1. In a device for supporting a group of conductors, a U-shaped member having two parallel sides, a connecting section and attaching means, and a second U-shaped member having parallel portions in substantial alignment with the sides of the first member interlocked with the connecting section of the first member and a connecting section parallel to the connecting section of the first member and cooperating therewith due to the distance between the respective connecting sections being less than the thickness of the conductors for firmly clamping said group of conductors.

2. In a device for supporting a group of conductors, a U-shaped member having two side sections and a connecting section, one end of said side sections being provided with hooked portions for attaching the member and the other end being provided with hook interlocking portions, and a member of similar construction having its hooked portions secured to the interlocking portions of the other member and cooperating with the connecting section due to the distance between the respective connecting sections being less than the thickness of the conductors for firmly clamping said group of conductors.

3. In a device for supporting a plurality of groups of conductors, a U-shaped member having a bowed section with a looped portion at each end thereof, and attaching means, and a member having a bowed section and elements extending from said bowed section and arranged with hooked portions for engaging looped portions of the U-shaped member, the distance between the respective bowed sections being less than the thickness of the conductors whereby said group of conductors is firmly clamped.

In witness whereof, I hereunto subscribe my name this 14th day of October A. D., 1924.

GUY JOSEPH HOUTS.